Nov. 29, 1955  A. D. PRIOR  2,725,550
INDICATING SYSTEM

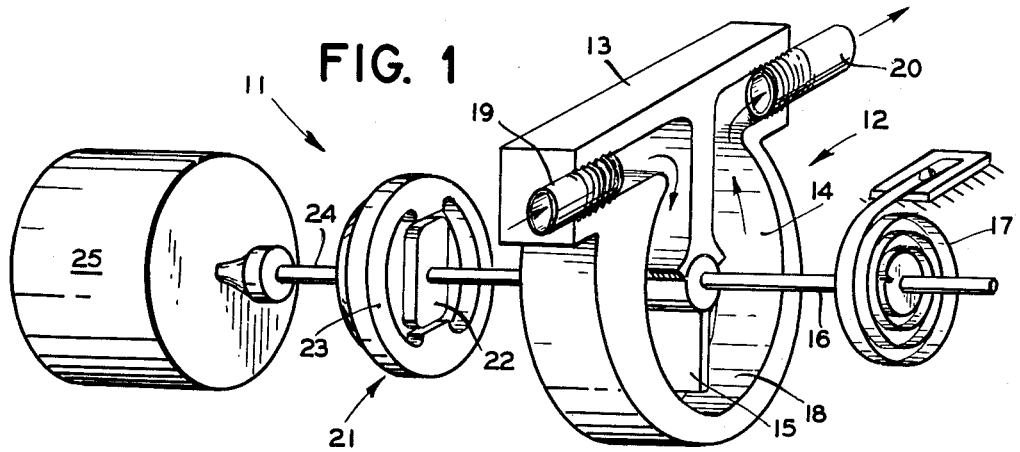

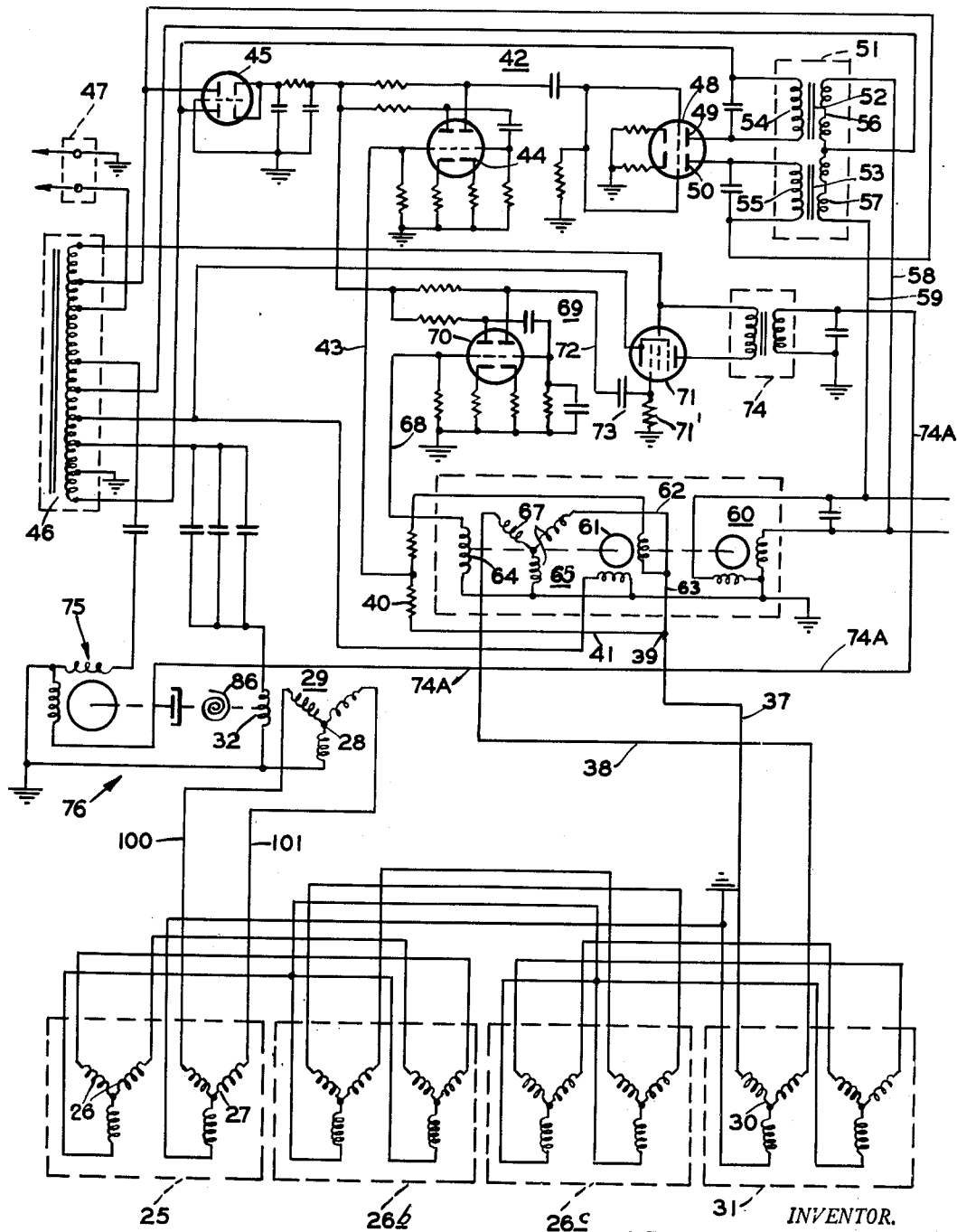

Filed Feb. 8, 1951  3 Sheets-Sheet 3

INVENTOR.
ARTHUR D. PRIOR
BY
C. R. Miranda
ATTORNEY

United States Patent Office 2,725,550
Patented Nov. 29, 1955

2,725,550

INDICATING SYSTEM

Arthur D. Prior, Glen Rock, N. J., assignor to Bendix Aviation Corporation, Teterboro, N. J., a corporation of Delaware Application February 8, 1951, Serial No. 210,051

11 Claims. (Cl. 340—187)

The present invention generally relates to remote indicating or controlling systems and more particularly to flow meter systems for indicating at one point the rate of flow of a fluid occurring at another and remote point.

Flow meter systems, such as aircraft fuel flow meters, for example, heretofore known generally utilize a flow detecting unit at the engine having an inductive transmitter device for developing an electrical signal corresponding to the rate at which fuel is supplied to the engine. In some cases the signal is fed into a remotely located inductive receiver device whose output is amplified by way of an electronic or magnetic amplifier to drive a motor to position the receiver device into synchronism with the transmitter device, an indicator being angularly displaceable with the receiver device. In other cases the transmitter signal is amplified directly to drive a remotely located motor which positions an inductive device into synchronism with the transmitter, an indicator being angularly displaceable with the latter inductive device.

Since in both cases an indication of rate of fuel flow is obtained, the motor is run constantly at a speed corresponding to the rate of fuel flow and through a drag coupling positions the receiver or inductive indicator device into synchronism with the transmitter device. Because some error must exist in the system to sustain its operation for a given rate of fuel flow, a reading at the indicator will be obtained which is not a true indication of the condition existing at the transmitter. Moreover, due to temperature changes affecting the motor or due to aging of the amplifier tubes, greater voltages will be required to run the motor resulting in larger errors occurring in the system. Another disadvantage with systems of the above character is that should for some reason the flow meter transmitter become displaced with respect to the inductive device of the indicator an angular amount exceeding 180 degrees the system will become inoperative due to the phase reversal to which the motor, being uni-directional in operation, is insensitive.

The present invention contemplates the provision of a new and novel remote indicating or controlling system in which the error signal normally occurring between the transmitter and the indicator is transferred to or repeated by an automatic reset mechanism which acts to bring the transmitter and the indicator into true synchronism thereby overcoming the disadvantages arising with the use of conventional systems.

An object of the present invention, therefore, is to provide a novel remote indicating or controlling system in which the errors previously occurring in such systems have been eliminated.

Another object is to provide a novel fuel flow meter system embodying an automatic reset mechanism whereby a true indication of the rate of fuel flow occurring at one point will be provided at another and remote point.

Still another object is to provide a novel indicating system wherein phase reversal due to greater than 180 degrees displacement between a transmitter and a receiver does not effect erratic operation of the system.

A still further object is to provide an indicating system employing a novel automatic reset means which eliminates the need for an error signal between a transmitter and a receiver in order to maintain an indicator motor at proper operating speed.

Another object is to provide an indicating system with a novel automatic reset means which continually brings the system into equilibrium under all conditions of operation.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

In the drawings wherein like reference numerals refer to like parts,

Fig. 1 is a diagrammatic illustration of a fuel flow meter transmitter comprising a component of the novel remote indicating system of the present invention;

Fig. 2 is a schematic wiring diagram of the novel remote indicating system hereof;

Fig. 3 is a side view of one form of an indicator comprising another component of the novel system hereof;

Fig. 4 is a front view of the indicator of Figure 3 showing in particular the rate of fluid flow pointer and the fuel remaining counter.

Figure 5:
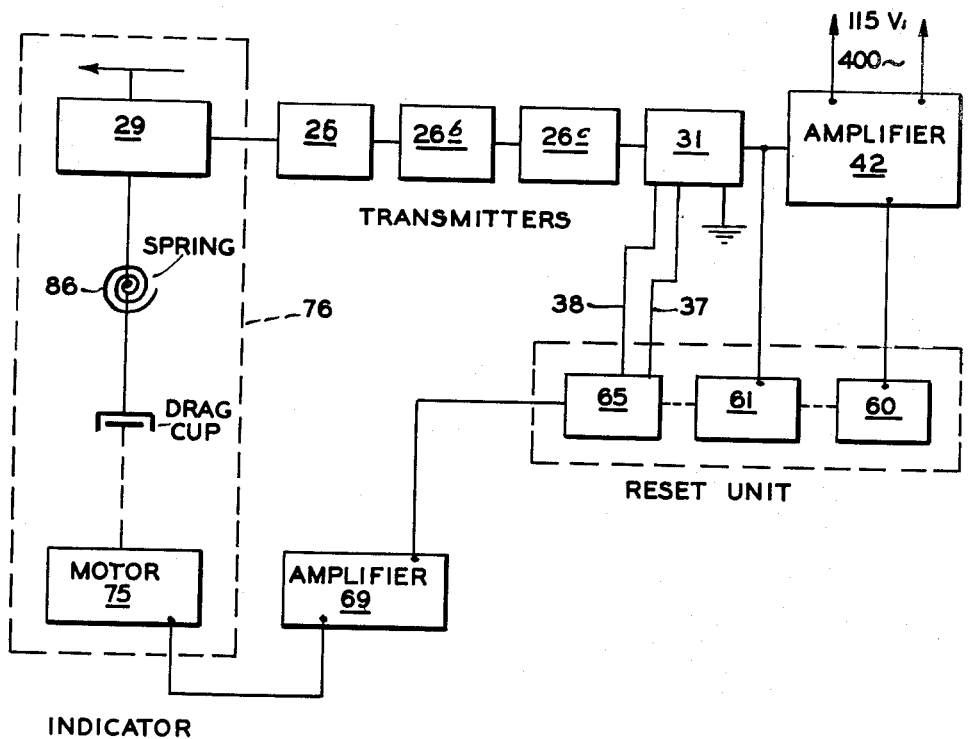
Fig. 5 is a block diagram to clearly illustrate the relationship of the elements comprising the novel remote control system of the instant invention.

The instant invention is illustrated herein as applied to a rate of fuel flow totalizing indicating system for indicating the rate at which fuel is being supplied to a plurality of internal combustion engines. It will be apparent to those skilled in the art that this system may be used for a variety of purposes such as for aircraft, sea craft and other mobile vehicles operating on land. The number of transmitters is not essential to the operation of the present invention inasmuch as the system with slight changes made therein may be used to indicate the rate of flow of fuel to a single engine. This will be readily understood as the present invention is described in detail hereinafter.

Referring now to the drawings for a more detailed description of the present invention and more particularly to Fig. 1 thereof, the novel indicating system hereof embodies a rate of flow transmitter 11, only one of which is shown, and includes a conventional vane type fuel flow meter 12. Flow meter 12 comprises a housing 13 having a chamber 14 formed therein through which fuel flows. A vane 15 is pivotally mounted in chamber 14 eccentrically of housing 13, and has connected thereto a shaft 16 biased in a clockwise direction by a hairspring 17 as seen in Fig. 1. A small orifice 18 which progressively increases in size due to the eccentric mounting of vane 15, is formed between housing 13 and the vane. Fuel enters housing 13 through a conduit or fuel line 19 threadedly secured to the housing to displace vane 15 in a counter-clockwise direction against the action of spring 17. The fuel flows through variable orifice 18 and out of the housing by way of an outlet pipe line 20 to an engine not shown. By properly contouring the wall of housing 13 to control the rate of increase in the size of orifice 18 a linear relation is accomplished between the angular displacement of vane 15 relative to housing 13, and the rate at which the fuel flows through the meter. In this manner, the angular displacement of vane 15 is directly proportional to the rate of fuel flow through fuel line 19. A magnetic coupling 21 is adapted to be driven by angular displacement of shaft 16 and comprises a pair of magnets 22 and 23. Magnet 22 is fixed to shaft 16 and is angularly displaceable within a ring-shaped magnet 23 to effect driving of the latter magnet upon angular displacement of shaft 16. A shaft 24 is fixed to magnet 23 at one end and is driven thereby to displace a rotor of an inductive transmitter device 25.

The present invention as shown in Fig. 2 contemplates a system for measuring the rate of fuel flow to four internal combustion engines. Associated with each engine is a flow meter 12 of the type hereinabove described and an inductive transmitting device of the type shown in Fig. 1. The inductive transmitting devices are schematically shown in Fig. 2 as each comprising three phase rotor windings and three phase stator windings and are so arranged that the rotor windings of one are connected to the stator windings of the next inductive device. In the case of the first inductive device 25, two of the stator windings 27 thereof are connected to two corresponding stator windings 28 of one inductive indicator device 29 while the rotor windings 30 of the last inductive transmitting device 31 receive signals representing the total output of the bank of inductive transmitting devices 25, 26b, 26c and 31. The rotor 32 of inductive indicator device 29 is energized from a suitable source of alternating current 47. The bank of inductive transmitter devices is so arranged as to provide a summation of the angular displacements of each of vanes 15 which corresponds to the total rate of fuel flow to the engines. When rotor winding 32 of inductive device 29 is in its normally null or rest position and no fuel is being supplied to the engines, voltages will be induced in each of the windings of stator 28 the resultant magnetic field of which will be represented by a flux vector bisecting the two upper stator windings. The voltages in each stator winding will be of such a value that no potential difference will exist between the terminals of the two upper windings but a potential difference will exist between the terminal of the lower winding and the terminals of the two upper windings. The same signals will be communicated by leads 100 and 101 to corresponding windings of the stator of inductive transmitter 25, reproduced at the rotor windings of transmitter 25, communicated to the corresponding stator windings of inductive transmitter 26b until, finally, the same signals will appear in each of the corresponding stator windings of inductive transmitter 31. Thus during a rest condition the vector representing the resultant magnetic field at the stator of inductive transmitter 31 will be in positional agreement with the flux vector of stator 28 of inductive device 29.

When fuel flow to the engines begins, the vanes 15 of each flow meter will be displaced corresponding to the rate of fuel flow through each flow meter thereby causing corresponding angular displacement of the transmitters. Displacement of rotor 26 relative to its stator 27 will provide a change in the induced voltages of each of the rotor windings which change is communicated to the stator windings of transmitter 26b thereby causing an angular displacement of the flux vector of the latter an amount corresponding to the angular displacement of rotor 26 by its flow meter. Varying signals will be induced in the rotor of transmitter 26b due to the changed flux vector and since the rotor is also angularly displaced by its flow meter the voltages in the rotor will be varied further and their final values communicated to the stator of transmitter 26c. The flux vector at the stator of the latter transmitter will change an angular amount corresponding to the sum of the angular displacements of the rotors of transmitters 25 and 26b. The voltages in the rotor of transmitter 26c will change as a result of the changed flux vector at the stator and also because of its own angular displacement by the flow meter so that a change is produced in the flux vector of the stator windings of transmitter 31 which corresponds to the sum of rotor displacements of transmitters 25, 26b and 26c. The voltage in rotor 30 of transmitter 31 will therefore be varied due to the changed flux vector and also because of its own angular displacement by its related flow meter so that the positional disagreement between the flux vector of rotor 30 and that of stator 28, designated as an error signal, will represent the extent of non-synchronism between transmitter 31 and inductive device 29.

The changed voltages appearing in each of the windings of rotor 30 are communicated by way of leads 37 and 38 to the corresponding three stator windings of an inductive reset device 65 having an inductively coupled single phase rotor winding 64. The resultant or error voltage of rotor 30 of transmitter 31 also appears at a terminal 39 and is communicated therefrom by way of a lead 41, a resistor 40 and a lead 43 to a high gain reset amplifier 42. Amplifier 42 contains a twin-triode amplifying tube 44 which is supplied with D. C. plate potential from a full wave rectifier 45 connected to a power supply transformer 46 supplied with alternating current from the source 47. The error signal is fed to the grid of tube 44, amplified, and transmitted to a twin-triode discriminator tube 48. Tube 48 operates in a well known manner to pass at any instant a signal of one phase. In other words, if it is assumed that plate 49 is provided with a potential of a given phase, then it will only pass signals of that phase, whereas if plate 50 is provided with a potential of an opposite phase, only signals of like phase will render this portion of the tube conductive. Since the output of tube 44 at any instant is of one polarity, only one plate of tube 48 will conduct. Connected to the output of tube 48 is a magnetic amplifier 51 which comprises a pair of inluctors 52 and 53 having iron cores. Upon saturation of either core by its respective saturating winding 54 and 55, the latter tend to decrease the impedance in either of output windings 56 and 57 to permit a current flow in conductors 58 and 59 to drive a low inertia reset induction motor 60. Depending on which saturating winding is energized which, in turn, depends upon the phase of the error signal impressed on tube 44, the motor 60 will be driven in a clockwise or counter-clockwise direction. For purposes of illustration let it be assumed that energization of saturating winding 54 drives the motor 60 in a clockwise direction while energization of winding 55 drives it in a counter-clockwise direction. the motor 60 drives a rate generator 61 to derive a voltage proportional to the speed of operation of the motor and also displaces the single phase rotor winding 64 of inductive reset device 65 through a high ratio gear train (not shown) which prevents rapid changes in the positioning of the rotor winding for a reason to be explained hereinafter. The inductive reset device 65 includes the three phase stator winding 67 which is connected to receive the error signal from output inductive device 31 by way of conductors 62, 63 and 37, 38.

It will be apparent that the error signal from inductive device 31 will produce a magnetic field in stator winding 67 whose resultant flux vector will assume an angular position corresponding to the angular position of the flux vector at rotor 30. The inductive reset device 65 acts in a manner similar to a variable transformer. With rotor winding 64 positioned in such a manner that its electrical axis is at a null or normal position relative to the resultant flux vector of the windings of stator 67, no signal will appear at the rotor winding. This condition will obtain during a rest condition when the entire system is in electrical equilibrium. If the rotor winding is angularly displaced by motor 60 relative to the stator windings, assuming no change to have taken place in the angular position of the flux vector at the stator windings, its electrical axis will be in some position other than normal relative to the resultant magnetic field at the stator windings so that a signal will appear at the rotor winding, the magnitude and phase of such signal being dependent upon the amount and direction of rotor displacement.

Rotor winding 64 of inductive reset device 65 is connected by way of conductor 68 to a low gain amplifier designated by the numeral 69. Amplifier 69 comprises a twin-triode amplifier tube 70 which is supplied with D. C. plate potential by rectifier tube 45. The output from tube 70 is fed to a power output pentode tube 71 by conductor 72 through a condenser 73. Tube 71 has its control grid connected to ground through a resistor 71' and is energized in such a manner that it conducts only when signals of one phase are fed to it. An output transformer 74 amplifies the output of pentode 71 to drive a low inertia variable speed indicator motor 75, shown diagrammatically in Figs. 2 and 3, by way of conductor 74A.

The fuel flow indicator of the instant invention is shown in Fig. 3 of the drawings hereof and is generally designated by the numeral 76. The indicator 76 comprises a cylindrical casing (shown cut away in Fig. 3) in which is mounted the low inertia motor 75 on a bracket 78. Shaft 79 of motor 75 drives a second shaft 80 through a speed step up gear train 81 to rotate a disc magnet 82 connected to the other end of shaft 80. Magnet 82 forms a part of a magnetic drag coupling 83 which includes a drag cup 84 in which the magnet rotates. Drag cup 84 is displaced angularly by the rotation of magnet 82 due to the development of eddy currents induced within the cup. The theory of operation of the magnetic drag coupling is well known to those skilled in the art and therefore no elaboration thereon will be made. Cup 84 is secured to one end of a shaft 85 which is biased by a calibration spring 86. Shaft 85 angularly displaces the rotor winding 32 of inductive indicator device 29 with respect to its stator winding 28. It is to be noted that upon deenergization of motor 75, spring 86 operates to return rotor winding 32 to a normal reference position wherein, in the absence of fuel flow through the flow meters, the resultant flux vector in the windings of stator 29 will be in positional agreement with the flux vector of the windings of the stator of transmitter 31. A pointer 90 is mounted for movement by shaft 85 relative to a dial 91 (Fig. 4) bearing graduated indicia 92. The total rate of fuel flow applied to the engine may be read off the dial 91 depending upon the position of the pointer 90 with respect to the dial. The combination of magnet 82, drag cup 84 and calibration spring 86 constitutes a tachometer which will effect displacement of rotor winding 32 and pointer 90 with a linear relationship relative to the speed of the low inertia motor 75 to provide accurate indications of the rate of fuel flow supplied to the engines. A counter 93 for indicating the amount of fuel remainilng aboard the craft, is connected through a worm gear arrangement to shaft 94, gear train 81, and to motor shaft 79. Since the calibration of the flow meters 12 is linear, the number of revolutions per minute of the motor shaft 79 has a linear relationship to the rate of fuel flow. Therefore, by counting the number of revolutions of the motor shaft and counter 93, the quantity of fuel used is totalized on the counter, which may be seen in Fig. 4 through a slot 95 formed in the face of dial 91. The subtraction counter 93 may be reset by a knob 96 to indicate the quantity of fuel on board the craft before consumption thereof begins, and, as it is consumed, the counter will indicate the quantity remaining.

Considering now the operation of the arrangement above described, it may be assumed that the system is at rest and no fuel is being supplied to the engines. At such time the system is in equilibrium because the resultant flux vectors at inductive indicator device 29 and inductive transmitter 31 are in positional agreement and no error signal appears at either terminal 39 or rotor winding 64 of inductive reset device 65. As fuel flow to the engines begins, the vanes 15 of the flow meters are displaced on angular amount corresponding to the rate of fuel flow therethrough whereupon the resultant magnetic field at stator 67 of reset device 65 will have been displaced angularly relative to the resultant flux vector of stator 28 of inductive indicator device 29 an amount corresponding to the sum of the angular displacements of the flow meter vanes. This displacement of the flux vector at rotor 30 of transmitter 31 relative to the resultant flux vector at device 29, when the latter is still at rest due to spring 86, and reproduced at the stator windings 67 of reset device 65, provides an error signal at rotor winding 64. The error signal resulting in the changed voltages of the rotor winding 30 of transmitter 31 also appears at terminal 39.

In order to more clearly understand the operation of the system, it may be assumed that reset amplifier 42, discriminator 48, magnetic amplifier 51, reset motor 60 and rate generator 61 are either locked or not present in the system. Stator winding 67 of reset device 65 will have reproduced therein the same angular displacement of its resultant magnetic field, relative to the resultant magnetic field at stator 28 of device 29, as that occurring at rotor 30 of transmitter 31. The displacement of the resultant magnetic field at stator 67 relative to the electrical axis of rotor winding 64 will induce in the rotor winding a voltage proportional to the error signal. The voltage so induced is fed to low gain amplifier 69, through power output tube 71 and transformer 74 to drive indicator motor 75. The motor will operate at a speed corresponding to the total rate of fuel flow and will angularly displace rotor 32 through the magnetic drag coupling until the resultant magnetic field at stator 28 will have been brought into positional agreement with the resultant magnetic field appearing at rotor 30 of transmitter 31. A condition of electrical equilibrium will have thus been re-established bringing the error signal to zero. It will be apparent that should the error signal actually be reduced to zero the motor will become deenergized causing the pointer 90 to return toward zero under the action of spring 86. Since fuel flow continues, the motor would again operate so that undesirable oscillation of the pointer would result.

Inasmuch as motor 75 must drive pointer 90 and rotor winding 32 through the magnetic drag coupling and against spring 86 in order to hold rotor 32 at this new equilibrium position the error signal will never actually be reduced to zero but some error signal, known as droop, will remain in the system between devices 29 and 31 to maintain the motor running. This error signal will vary with varying temperature and other conditions so that an inaccurate indication of rate of fuel flow will be obtained.

In accordance with the present invention, the novel automatic reset mechanism hereof is provided so that inductive reset device 65 thereof will provide a signal corresponding to the error signal existing between inductive indicator device 29 and transmitter device 31 to operate motor 75 to reduce this error signal actually to zero so that devices 29 and 31 will be in exact synchronism, reset device 65 supplying the necessary droop signal for maintaining operation of motor 75. Considering now the operation of the complete system including the automatic reset mechanism, the error signal which appears at rotor winding 64 of reset device 65 for operating motor 75 also appears at terminal 39 and is fed by way of lead 41, resistor 40 and lead 43 to reset amplifier 42. The error signal is there amplified and depending upon its phase is passed by either the upper or lower section of discriminator tube 48 through either of the saturable transformers to drive reset motor 60. The latter motor is so arranged that it displaces rotor winding 64 relative to its stator 67 in a direction to augment the error signal at the rotor winding with a droop component signal. The augmented error signal is communicated to motor 75 by way of amplifier 69 to increase the operation of motor 75. Such increased operation on the part of the motor displaces rotor winding 32 an additional amount sufficient to reduce the error signal between inductive device 29 and transmitter 31 to zero. The system thus attains synchronism and no error signal will be available at terminal 39 whereupon reset motor 60 becomes deenergized. Rotor winding 64, however, remains displaced relative to its stator so that a droop signal is available therein for maintaining operation of motor 75 whereby synchronism exists between devices 29 and 31 providing an accurate indication of the rate of fuel flow at the indicator.

In addition to angularly displacing rotor winding 64, reset motor 60 also operates a generator 61 which develops a signal proportional to the rate of operation of the reset motor. This rate signal is mixed with the error signal appearing at terminal 39 and fed into reset amplifier 42 to prevent hunting on the part of the reset motor.

The inductive reset device 65 is so connected that it operates to keep the system constantly in equilibrium. Thus, if it is assumed in the above case, that the rate of fuel being supplied decreases, resulting in a reduction of the total displacement of vanes 15, the automatic reset mechanism operates to reduce the speed of indicator motor 75 and the displacement of pointer 90 proportionately. With this condition the system is unbalanced and the error signal appearing at terminal 39 now is of a negative or opposite polarity since the rotor winding 32 is displaced a greater amount than the total displacement of the rotors in the transmitting inductive devices. This negative error signal appears at terminal 39 and in stator windings 67 to reverse the resultant magnetic field therein. Accordingly, a signal of reversed phase will be induced in rotor winding 64, and transmitted to amplifier 69. Heretofore, it was explained that power output tube 71 acted as a discriminator and became conductive only when energized by signals of a given phase. For this reason, energization of motor 75 will be cut off and rotor winding 32 will begin to return to a null or zero position due to the action of calibration spring 86. As winding 32 is returned toward its null position it will reach a position wherein the error signal becomes positive again to start driving motor 75 to again place the system in equilibrium.

When the flux vector induced in inductive device 29 and the flux vector induced in inductive transmitter device 31 is more than 180 degrees out of phase, a voltage phase reversal occurs in the system. This condition may result if the rotor of indicator inductive device, during normal operation, is positioned at say 220 degrees and a power failure occurs. Rotor 32 of inductive device 29 is returned by spring 86 to zero rest position, but the rotors of inductive transmitter devices 25, 26b, 26c, and 31 are disposed so that the resulting flux vector is displaced 220 degrees. The rotor of inductive reset device 65 remains displaced to provide a droop signal.

When normal operating voltage is again applied to the system, the signal from inductive devices 25, 26b, 26c, 29, 31 and 65 is of reverse phase and power tube 71 is biased to cut-off. The error signal, also of reverse phase, is applied to amplifier 42, and the phase of the amplified signal is discriminated against by discriminator 48 and saturating winding 55 of inductor 53 is energized by the output of the discriminator, whereby current flows in conductors 58, 59 to operate reset motor 60 and drive rotor winding 64 in a direction so that the combined signals from inductive devices 25, 26b, 26c, 29, 31 and 65 are of proper phase to operate amplifier 69, whereupon tube 71 is again rendered conductive and indicator motor 75 operates and displaces rotor winding 32 to decrease the error signal between stator winding 28 and inductive transmitter device 31.

When the flux vector of indicator induction device 29 is 180 degrees out of phase with the flux vector of transmitter inductive device 31, the error signal is zero and reset motor 60 is denergized and the rotor 64 of reset inductive device 65 stops its angular motion. However, the algebraic sum of the signals from inductive devices 25, 26b, 26c, 29, 31 and 65 is still of proper phase to operate amplifier 69 and indicator motor 75 continues to rotate to maintain the displacement of rotor 32 of indicator inductive device 29. The error signal reverses phase and reset motor 60 rotates rotor 64 of reset inductive device 65 in the opposite direction. When the flux vector of indicator inductive device 29 is displaced 90 degrees relative to the flux vector of transmitter inductive device 31, the error signal becomes a maximum and then gradually decreases until the flux vectors of indicator inductive device and transmitter inductive device are in angular agreement, whereupon the error signal again is zero and reset motor 60 stops. The rotor of reset inductive device 65 is displaced by an angle corresponding to the droop voltage. With this arrangement described, the flux vector of indicator inductive device 29 will be rotated to agreement with the flux vector of transmitter inductive device and indicator 90 will indicate correct fuel consumption of the engines with which the system is used.

Novel means is provided for eliminating errors from a fuel indicating system caused by aging of tubes in low gain amplifier 69, and by subjecting motor 75 to below normal operating temperatures. Under these conditions, the droop voltage at rotor winding 64 of variable control device 65 increases and provides low gain amplifier 69 with sufficient grid voltage to drive motor 75 at a speed so that the signal from the indicating signal generator is equal and opposite to the sum of the signals from the transmitting inductive devices.

The system has been described to indicate fuel consumption of four engines, but it is understood that the system may be used to indicate fuel flow for any number of engines by providing a transmitter inductive device for each engine. If the system is used for a single engine, then only a single transmitting inductive device 25 is used, and rotor winding 26 of transmitter 25 is connected to the stator winding 67 of variable voltage device 65.

The present invention is described in connection with a system for indicating rate of fuel flow, but the system may be employed for indicating the rate of change of a condition or conditions at remote points.

Although a particular embodiment of the invention has been illustrated and described in detail by way of example, it is to be expressly understood that the invention is not limited thereto; various changes may be made in the design and in the arrangement of parts without departing from the spirit and scope of the invention as defined by the appended claims as will now be understood by those skilled in the art.

I claim:

1. In a system for indicating the value of a condition, at least one transmitter signal generator for developing a first signal corresponding to the value of said condition, an indicator signal generator in circuit with said transmitter signal generator and adapted to develop a second signal in opposition to said first signal, a reset signal generator in circuit with said indicator and transmitter signal generators for providing a droop signal to control said indicator signal generator and actuated in response to the difference between said first and second signals when said condition changes to change said droop signal so that the difference between said first and second signals disappears when said condition becomes substantially constant.

2. In a system for indicating the value of a condition, a transmitter signal generator for developing a signal corresponding to the value of said condition, a second signal generator in circuit with said transmitter signal generator and adapted to develop a signal in opposition to said first-mentioned signal, a reset signal generator in circuit with said transmitter signal generator and said second signal generator, a first servo device operatively responsive to the difference between said signals when the condition changes and controlling said reset signal generator to provide a droop signal, and a second servo device responsive to the droop signal and controlling said second signal generator to produce a signal nullifying the signal from said transmitter signal generator when the condition remains substantially constant.

3. In an indicating system of the kind described, a transmitter signal generator adapted to be actuated by a condition to provide a first signal corresponding thereto, a second signal generator in circuit therewith to provide a second signal in opposition to said first signal, a reset signal generator in circuit with said transmitter signal generator to provide a third signal, means responsive to the error existing between said second signal generator and said transmitter signal generator to displace said reset signal generator to alter said third signal, and means responsive to the algebraic sum of said first, second and third signals to displace said second signal generator until said error is substantially removed.

4. In an indicating system of the kind described, a transmitter signal generator adapted to be actuated by a condition to provide first signals corresponding thereto, an indicating signal generator in circuit therewith and for providing second signals, yielding means urging said indicating signal generator to a predetermined position, a reset signal generator in circuit with said transmitter signal generator and with said indicator signal generator to provide a reset signal, means responsive to the error existing between said indicator signal generator and said transmitter signal generator for displacing said reset signal generator to alter said reset signal, driving means responsive to the algebraic sum of said first, second and reset signals, and a drag cup drivably connecting said driving means to said indicator signal generator whereby said indicator signal generator is displaced in opposition to said yielding means to provide a signal corresponding to the signal of said transmitter signal generator.

5. In a fuel flow meter of the kind described, at least one transmitter signal generator adapted to be actuated by fuel flow for providing a first signal corresponding thereto, an indicator signal generator in circuit therewith for developing a second signal in opposition to said first signal, a reset signal generator in circuit with said indicator and transmitter signal generators for providing a third signal to control said indicator signal generator and having an error signal component corresponding to the difference between said first and second signals and having a droop component and actuated in response to the difference between said first and second signals when the rate of fuel flow changes to alter said third signal until said error signal component becomes zero and the magnitude of said third signal equals the magnitude of said droop component.

6. In a fluid flow meter of the kind described, an indicator signal generator, fluid flow indicating means, a transmitter signal generator in circuit therewith and providing a signal corresponding to fluid flow, an amplifier receiving and amplifying an error signal corresponding to the error between said indicator signal generator and said transmitter signal generator, means including a reset signal generator in circuit with said indicator signal generator and producing a driving signal having a reset component and an error component corresponding to said error signal, a motor responsive to the output of said amplifier and drivably connected to said reset signal generator to control the magnitude of said driving signal, a second amplifier receiving and amplifying said driving signal, a second motor responsive to the output of said second amplifier, and a drag cup drivably connecting said second motor to said indicator signal generator and to said indicating means.

7. In a fluid flow meter of the kind described, an indicator signal generator for providing a signal, fluid flow indicating means, at least one transmitter signal generator in circuit therewith and adapted to be actuated by fluid flow for providing a signal corresponding thereto, means for developing an error signal corresponding to the error between said indicator signal generator and said transmitter signal generator, means including a reset signal generator in circuit with said indicator signal generator and producing a driving signal having a reset component and an error component corresponding to said error signal, means responsive to said error signal and drivably connected to said reset signal generator to control the magnitude of said driving signal, a second servo device responsive to said driving signal, and a drag cup drivably connecting said second servo to said indicator signal generator and said indicating means.

8. In a fluid flow totalizing system adapted to measure rate of fluid flow to a plurality of devices, a transmitter signal generator for each of said devices and providing a signal corresponding to fluid flow in the associated device, an indicator signal generator connected in circuit with said transmitter signal generators and producing a signal opposing the signals from said transmitter generators, a reset signal generator in circuit with said indicator and transmitter signal generators and producing a driving signal for displacing said indicator signal generator and having a droop signal component and an error signal component corresponding to the difference between said indicator signal and the sum of said transmitter signals when the rate of total fluid flow changes and displaceable in response to said difference in signals to modify said driving signal, said indicator signal generator being displaced in response to said driving signal and producing a signal nullifying said sum of transmitter signals to reduce said error signal component to zero when the rate of total fluid flow remains substantially constant so that said driving signal has a magnitude equal to the magnitude of said droop signal component to maintain constant the displacement of said indicator signal generator.

9. In a fluid flow totalizing system adapted to measure rate of fluid flow to a plurality of devices, an indicator signal generator, for providing an indicator signal, means for indicating total fluid flow, a transmitter signal generator for each of said devices connected in circuit with said indicator signal generator and adapted to be actuated by fluid flow to the associated device and provide a signal corresponding thereto, a reset signal generator in circuit with said transmitter signal generators and with said indicator signal generator to provide a reset signal, means responsive to an error signal corresponding to the error between said indicator signal and the sum of the signals from said transmitter signal generators and driving said reset signal generator in response thereto to modify said reset signal, and means responsive to said modified reset signal for displacing said indicator signal generator.

10. In a fluid flow totalizing system adapted to measure rate of fluid flow to a plurality of devices, an indicator signal generator for providing an indicator signal, yielding means urging said indicator signal generator to a predetermined zero-signal position, a transmitter signal generator for each of said devices connected in circuit with said indicator signal generator and adapted to be actuated by fluid flow to the associated device and to provide a transmitter signal corresponding thereto, a reset signal generator in circuit with said transmitter signal generators and with said indicator signal generator for providing a droop signal, a first servo device responsive to an error signal corresponding to the difference between said indicator signal and the sum of the signals from said transmitter signal generators and driving said reset signal generator in response thereto to modify said droop signal, a second servo responsive to the algebraic sum of said transmitter signals, said indicator signal and said reset signal, a drag cup drivably connecting said second servo device to said indicator signal generator whereby said indicator signal generator is driven by said second servo device in opposition to said yielding means to a position to nullify said transmitter signals, and means driven by said drag cup for indicating the total rate of fluid flow.

11. In a fluid flow meter of the kind described, an indicator signal generator for providing an indicator signal, yielding means urging said indicator signal generator to a predetermined zero-signal position, at least one transmitter signal generator in circuit with said indicator signal generator and providing a transmitter signal corresponding to fluid flow, a reset signal generator in circuit with said indicator and transmitter signal generators for providing a droop signal, an amplifier receiving and amplifying an error signal corresponding to the error between said indicator signal generator and said transmitter signal generator, a motor responsive to the output of said amplifier and drivably connected to said reset signal generator to modify said droop signal, a second amplifier receiving and amplifying the algebraic sum of said transmitter signal, said indicator signal and said droop signal from said indicator signal generator, said transmitter signal generator and said reset signal generator, a second motor responsive to the output of said second amplifier, a drag cup drivably connecting said second motor to said indicator signal generator whereby said indicator signal generator is driven by said second motor in opposition to said yielding means to a position to nullify said transmitter signal, and means driven by said drag cup for indicating fluid flow.

References Cited in the file of this patent

UNITED STATES PATENTS

| | | |
|---|---|---|
| 1,614,217 | Thompson | Jan. 11, 1927 |
| 1,986,986 | Swartout | Jan. 8, 1935 |
| 2,039,404 | Green et al. | May 5, 1936 |
| 2,164,728 | Wey | July 4, 1939 |
| 2,432,772 | Lear | Dec. 16, 1947 |
| 2,525,967 | Smoot | Oct. 17, 1950 |